United States Patent [19]

Schneck

[11] 4,219,182

[45] Aug. 26, 1980

[54] LIQUID FLOW CONTROL VALVE

[75] Inventor: Werner Schneck, Speyer, Fed. Rep. of Germany

[73] Assignee: Ranco Incorporated, Ohio

[21] Appl. No.: 926,445

[22] Filed: Jul. 20, 1978

[30] Foreign Application Priority Data

Jul. 21, 1977 [DE] Fed. Rep. of Germany ... 7722822[U]

[51] Int. Cl.² ............................................. F16K 31/12
[52] U.S. Cl. ..................................... 251/58; 251/176
[58] Field of Search .................. 251/176, 61, 58, 174, 251/193, 328

[56] References Cited

U.S. PATENT DOCUMENTS

| 973,435 | 10/1910 | Hoyt | 251/176 |
|---|---|---|---|
| 1,550,725 | 8/1925 | Jung | 251/176 |
| 1,586,844 | 6/1926 | Rigby | 251/176 |
| 2,907,342 | 10/1959 | Berg | 251/176 X |
| 3,662,986 | 5/1972 | Domulewicz | 251/176 X |
| 3,926,406 | 12/1979 | Hind | 251/176 X |
| 3,933,339 | 1/1976 | Dietzach | 251/176 |

*Primary Examiner*—Harold W. Weakley
*Attorney, Agent, or Firm*—Watts, Hoffman, Fisher & Heinke Co.

[57] ABSTRACT

A flow control valve for controlling liquid flow, for example, water flow in a vehicle heating circuit, has a ceramic obturator plate which slides sealingly relative to a fixed sealing plate, the two plates having openings the degree of overlap of which determines the valve throughflow. A bowed leafspring maintains the slidable obturator plate in sealing contact with a mating face of the sealing plate.

5 Claims, 5 Drawing Figures

LIQUID FLOW CONTROL VALVE

BACKGROUND OF THE INVENTION

This invention relates to liquid flow control valves for controlling, for example, water flow in a vehicle heating system, of the type having a housing to which hose connections are made, and a valve obturator slidable in the housing relative to a sealing element.

For precise control of the interior heating system of a vehicle valves of the aforementioned type are used in the water circuit of a vehicle heating system for the purpose of regulating the flow of engine-heated water to a heat exchanger which in turn heats air supplied to the interior of the vehicle. For proper heating control it is necessary that the control of the smaller water throughflows be more accurate than the control of the larger water throughflows.

The accuracy of the adjustment of the valve for the control of the smaller water throughflows is to a large extent dependent upon the wear and tear on the valve caused by traces of foundry sand in the cooling water resulting from the casting of the engine block. Although the foundry sand is cleaned out of the coolant passages of the engine after casting of the block, it is inevitable that some sand remains and in use of the vehicle this sand is dislodged, contaminating the cooling water. This sand can become enbedded in the rubber and/or plastics used for sealing elements in the valves hitherto used to control water flow in vehicle heating systems, leading to abrasion of the metal surfaces with which sealing elements cooperate. Eventually this causes the valve to leak, with consequent loss of precision control of small water throughflows.

An object of the present invention is to provide a valve of the aforesaid type which is such that precise control of small water throughflows is maintained over an adequate working lifetime of the valve.

SUMMARY OF THE INVENTION

According to the invention there is provided a flow control valve for controlling water flow in a vehicle heating system of the type having a housing to which hose connections are made, and a valve obturator slidable in the housing relative to a sealing element, in which the valve obturator consists of a ceramic plate having an opening and the sealing element comprises a fixed ceramic plate having an opening, both said ceramic plates having mating surfaces which form a sliding seal, the degree of overlap of the openings in the plates determining the valve throughflow in each position of the valve obturator plate.

By using ceramic cooperating plates in the valve it is no longer possible for foundry sand or other particles in the circulating water to become embedded in the sealing element or the obturator and cause abrasion of the sealing surfaces. In fact the new valve pushes away laterally any sand that may be in the vicinity of the openings in the obturator plate or the sealing plate. In this way the surfaces of sliding contact between the two ceramic plates are maintained in good condition. Because of the hardness of the ceramic plates, any abrasive particles in the water make hardly any impression on the openings in the plates, and certainly not enough to alter their appearance or shape. Consequently even over a considerable working lifetime one need not expect a significant change in the valve flow control characteristics.

BRIEF DESCRIPTION OF THE DRAWINGS

The invention will be further described, by way of example, with reference to the accompanying drawings, in which.

DETAILED DESCRIPTION OF THE ILLUSTRATED EMBODIMENTS

Figure 1:
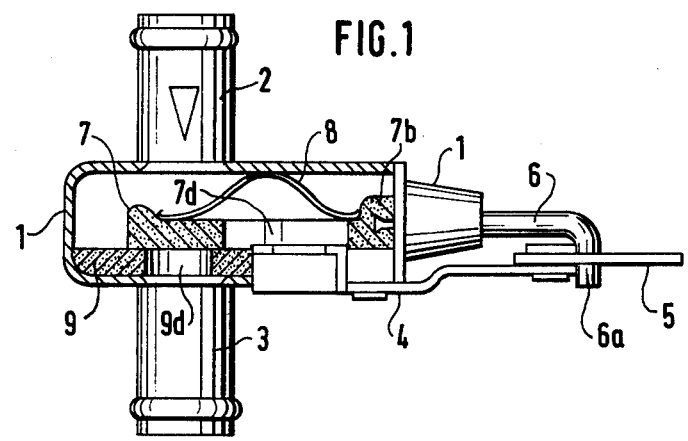
FIG. 1 is a side elevation of a valve according to one embodiment of the invention, partly in section.
Figure 2:
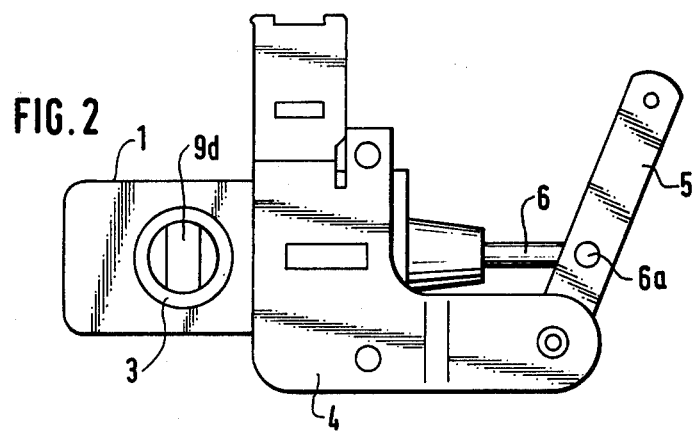
FIG. 2 a plan view of the valve shown in FIG. 1.

The same reference numerals are used in all the drawings to indicate the same or corresponding component parts.

Referring to FIGS. 1 to 4 the valve has a box-shaped housing 1 provided with tubular extensions 2, 3 which serve as inlet and outlet connections for rubber hoses. The housing 1 is also provided with an angle mounting bracket 4 and an operating lever 5. The operating lever 5 is pivoted at one end to the mounting bracket 4 and at a short distance from its fulcrum the lever has a pivotal connection to a bent end portion 6a of a valve-operating push rod 6. The push rod 6 passes through a seal into the interior of the housing 1 where it is connected to a displaceable ceramic obturator plate 7.

Figure 3:
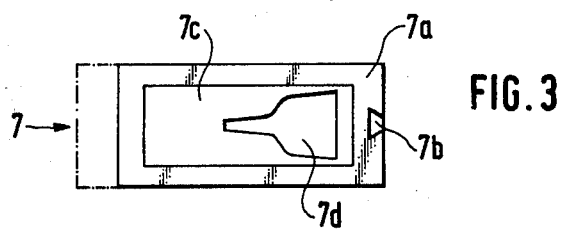
FIGS. 3 and 4 are plan views of details of the valve.

The ceramic obturator plate 7 is pressed by means of a bowed spring strip 8 against a fixed ceramic sealing plate 9. The surfaces of contact of the two ceramic plates 7, 9 are both ground flat to allow sliding movement of the plate 7 relative to the plate 9 while maintaining a good seal therebetween. The displaceable ceramic obturator plate 7 has a rectangular frame-like part as shown in FIG. 3, one of the shorter edges 7a of this frame part is formed with a notch 7b which tapers in width towards the outside of the frame. The end of the push rod 6 opposite the end portion 6a engages in the notch 7b. An insert 7c is formed with a funnel-shaped opening 7d and serves as a support surface for the bowed spring strip 8.

Figure 4:
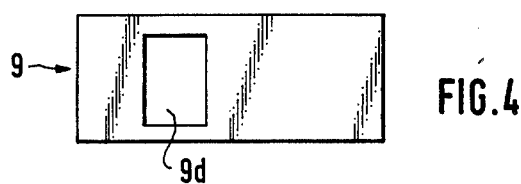

The rigid ceramic sealing plate 9 is shown in FIG. 4 and has a rectangular opening 9d the length of the plate 9 in the direction of displacement of the ceramic obturator plate 7 being greater than the length of the obturator plate 7 by the displacement stroke of the latter, shown in broken outline in FIG. 3.

When the openings 7d and 9d of the ceramic plates 7 and 9 do not overlap, the valve is closed. In other positions of the displaceable ceramic plate 7 the openings 7d and 9d overlap to a degree which defines a flow cross section or degree of opening of the valve. Displacement of the ceramic plate 7, and therefore control of the valve, is effected by movement of the operating lever 5, movement of which is transmitted to the plate 7 by the push rod 6.

In the embodiment of FIGS. 1 to 4 the valve is operated by means of the lever 5, which could for example be operated by means of a flexible operating cable.

Figure 5:
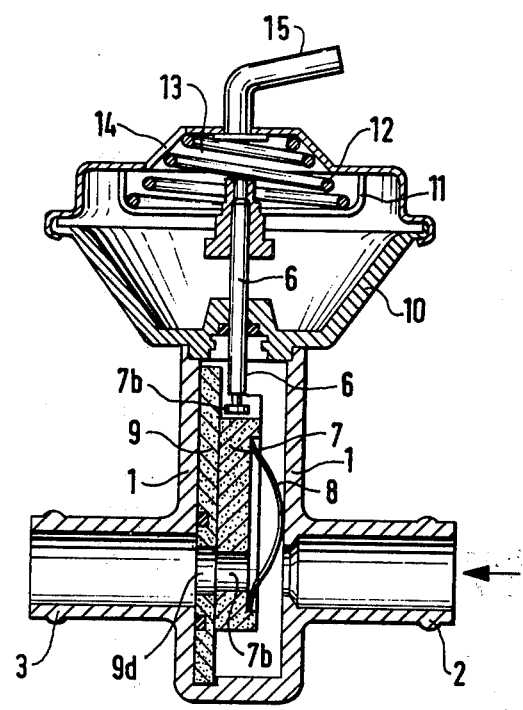
FIG. 5 is a cross-sectional view of a valve according to another embodiment of the invention.

In the embodiment shown in FIG. 5 the valve is provided with pneumatic actuator means. The valve housing 10 expands at one end to a funnel-shaped portion in which a diaphragm 11 of an elastomeric material such as rubber is clamped peripherally. The diaphragm 11 is acted upon by a spiral spring 12. The valve operating push rod 6 is connected to the centre of the diaphragm 11.

The diaphragm 11 defines a chamber 13 in which the spring 12 is located, the chamber 13 being vented to atmosphere through a vent 14. A stub pipe 15 communicating with the chamber 13 is adapted to be connected via a hose (not shown) to a vacuum source such as a suction pump. The diaphragm 11 has a central boss connected to the push rod 6 of a slide valve ceramic plate 7 as described earlier. The spring 12 urges the plate 7 into the closed position of the valve, the degree of vacuum in the chamber 13 determining an equilibrium position of the valve plate 7 and therefore a controllable degree of overlap of the openings 7d and 9d in the plates 7 and 9, so that the flow cross-section of the valve is precisely determined.

What is claimed is:

1. A flow control valve for controlling liquid flow in a vehicle heating system, comprising:
   (a) a housing having inlet and outlet connections;
   (b) a fixed ceramic plate in said housing;
   (c) a valve obturator member comprising a ceramic plate slidable in said housing relative to the fixed plate, both said ceramic plates having respective surfaces which cooperate with each other to form a sliding seal, and having respective openings, the degree of overlap of the openings in said plates determining the valve throughflow between the inlet and outlet connections in each position of the valve obturator plate relative to the fixed plate; and,
   (d) spring means for urging said valve plates together, said valve obturator plate having a frame-like portion defining a peripheral flange and said spring means comprising a bowed spring strip opposite ends of which engage the peripheral flange of the ceramic obturator plate to press the latter firmly against the fixed plate, said spring being braced between its ends against the housing.

2. Valve as defined in claim 1, wherein the fixed ceramic sealing plate has a length in the direction of movement of the obturator plate which is longer than the obturator plate by the amount of the displacement of the latter between its maximum and minimum flow positions.

3. Valve as defined in claim 1, including a valve actuating push-rod secured to the obturator plate and a seal in the housing through which the push-rod passes to the outside of the housing.

4. Valve as defined in claim 3, including a valve actuating lever connected externally of the housing to the push-rod and pivotally mounted on the outside of the housing.

5. Valve as defined in claim 3, including a pneumatic actuator device connected externally of the housing to the push-rod.

* * * * *